(No Model.)
T. R. TIMBY.
Car Axle.
No. 243,007. Patented June 14, 1881.
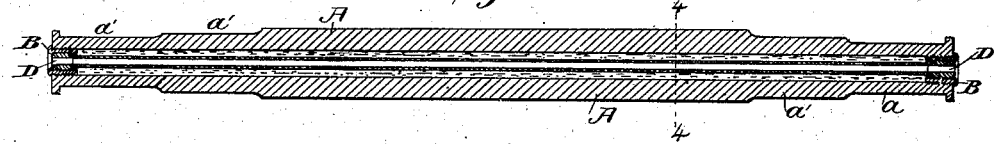
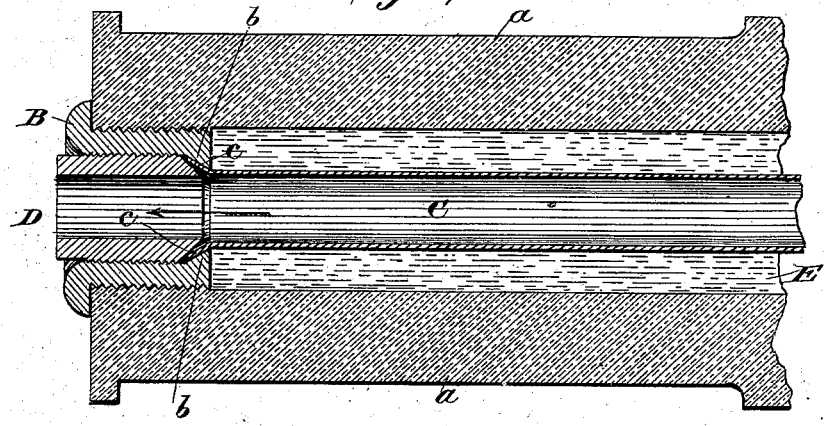
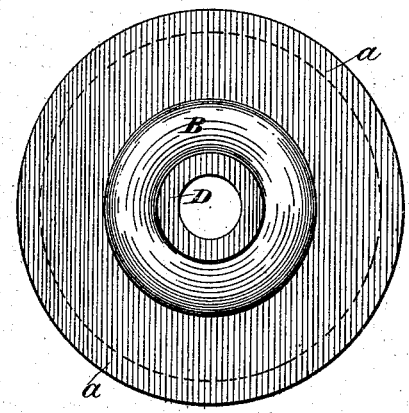
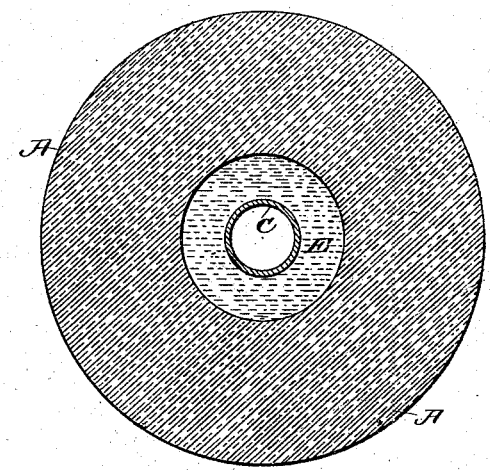
Attest:
Geo. T. Smallwood Jr.
Harry E. Knight
Inventor:
Theodore R. Timby
By Knight Bros.
Attys

UNITED STATES PATENT OFFICE.

THEODORE R. TIMBY, OF NYACK, NEW YORK.

CAR-AXLE.

SPECIFICATION forming part of Letters Patent No. 243,007, dated June 14, 1881.

Application filed May 6, 1881. (No model.)

*To all whom it may concern:*

Be it known that I, THEODORE R. TIMBY, a citizen of the United States, residing at Nyack, in the county of Rockland and State of New York, have invented Improvements in Hollow Axles for Railway-Cars and other Vehicles, of which the following is a specification.

My invention relates to an axle formed with a central opening extending from end to end; and it consists in constructing such an axle with an annular water-chamber surrounding a central opening which is exposed to the atmosphere.

The invention also relates to certain details by which to produce an axle or shaft of the construction specified, as hereinafter described.

In the accompanying drawings, Figure 1 represents a longitudinal section of my improved axle. Fig. 2 is a longitudinal section of one end of the same on a larger scale. Fig. 3 is an end view thereof. Fig. 4 is a transverse section on the line 4 4, Fig. 1.

A represents the body of the axle, formed with a journal, *a*, and wheel-seat *a'*, of customary external shape. The axle is made with a central opening extending from end to end, tapped near its extremities with screw-threads adapted for the reception of an annular plug, B, the bore of which converges toward the inner end, so as to form an oblique shoulder, *b*.

C represents a pipe, which may be of wrought iron or steel, and can be suitably formed of ordinary welded gas-pipe, the diameter adapting it to pass within the plug B and fit closely, or nearly so, within the inner end, *b*, thereof, where its opening is of the smallest diameter.

D represents a second annular plug, fitted and tapped within the hollow plug B, and tapered at its inner end, so as to enter within the end of the pipe C, and as it is screwed tightly home within the annular plug B, to swage the end of the pipe C, spreading it outward, as shown at *c*, closely against the inclined shoulder *b*, and thus forming a water-tight joint. I thus produce a tight annular cavity, E, around the pipe C, within the hollow axle A, and an opening within the pipe C, which latter is exposed to the air through the central openings of the inner annular plugs, D, forming an uninterrupted longitudinal opening from end to end, freely exposed to the air as stated.

In practice, the annular chamber E is filled with water, while the interior of the pipe C is left open for the circulation of the air. If preferred, the tight annular chamber E may be only partially filled with water, so that it will contain a body of air as well.

In operation, the water within the annular chamber E will circulate more or less as the axle rotates, and being, as is well known, an excellent conductor and imparter of heat, it will serve to carry heat from the journal and distribute it throughout the body of the axle and to the radiating-surface exposed to the atmosphere over the whole interior of the pipe C. The heat of the journal being thus constantly and rapidly conveyed away, its overheating is rendered practically impossible, and the durability or life of the axle is thus greatly increased by my improvement, while at the same time I avail myself of the well-known advantages of hollow axles in avoiding crystallization and other injury to the body of the metal in use, and I am enabled to produce an axle of great strength and durability at moderate cost.

Having thus described my invention, what I claim as new, and desire to secure by Letters Patent, is—

1. An axle for railway-cars and other vehicles, provided with an annular longitudinal cavity and a central opening within the same, substantially as herein described.

2. The combination of the axle-body A, the central tube, C, and suitable end plugs, B and D, to unite the same, substantially as herein set forth.

THEODORE R. TIMBY.

Witnesses:
 OCTAVIUS KNIGHT,
 HARRY E. KNIGHT.